(12) United States Patent
Koseki et al.

(10) Patent No.: US 11,929,214 B2
(45) Date of Patent: Mar. 12, 2024

(54) HYBRID ELECTROLYTIC CAPACITOR AND METHOD FOR MANUFACTURING SAME

(71) Applicant: NIPPON CHEMI-CON CORPORATION, Tokyo (JP)

(72) Inventors: Kazuya Koseki, Tokyo (JP); Kazuhiro Nagahara, Tokyo (JP); Kenji Machida, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 57 days.

(21) Appl. No.: 17/786,143

(22) PCT Filed: Dec. 15, 2020

(86) PCT No.: PCT/JP2020/046800
§ 371 (c)(1),
(2) Date: Jun. 16, 2022

(87) PCT Pub. No.: WO2021/125182
PCT Pub. Date: Jun. 24, 2021

(65) Prior Publication Data
US 2023/0017930 A1    Jan. 19, 2023

(30) Foreign Application Priority Data

Dec. 17, 2019  (JP) .............................. 2019-227343

(51) Int. Cl.
*H01G 9/028* (2006.01)
*H01G 9/00* (2006.01)
*H01G 9/055* (2006.01)

(52) U.S. Cl.
CPC .......... *H01G 9/028* (2013.01); *H01G 9/0032* (2013.01); *H01G 9/055* (2013.01)

(58) Field of Classification Search
CPC ...... H01G 9/028; H01G 9/0032; H01G 9/055; H01G 9/0036; H01G 9/0425; H01G 9/15; H01G 9/145
See application file for complete search history.

(56) References Cited

U.S. PATENT DOCUMENTS 6,515,847 B1    2/2003  Naraya
6,519,137 B1 *  2/2003  Nitta ....................... H01G 9/15
                                                          29/25.03

(Continued)

FOREIGN PATENT DOCUMENTS

JP    7-283088 A    10/1995
JP    11-54380 A    2/1999

(Continued)

OTHER PUBLICATIONS

International Search Report (PCT/ISA/210) issued in PCT/JP2020/046800, dated Mar. 23, 2021.

(Continued)

*Primary Examiner* — Dion R. Ferguson
(74) *Attorney, Agent, or Firm* — Birch, Stewart, Kolasch & Birch, LLP

(57) ABSTRACT

Provided is a hybrid electrolytic capacitor having large capacitance, low ESR, and superior high-frequency characteristics and high-temperature endurance. The hybrid electrolytic capacitor 1 is provided with: a cathode 10 having a cathode substrate 11 made of a valve metal, an oxide layer 12 provided on a surface of the cathode substrate 11, an inorganic conductive layer 13 provided on a surface of the oxide layer 12 and including an inorganic conductive material, and an organic conductive layer 14 provided on a surface of the inorganic conductive layer 13 and including a conductive polymer; an anode 20 having an anode substrate 21 made of a valve metal and a dielectric layer 22 provided on a surface of the anode substrate 21; and a composite (Continued)

electrolyte layer 30 having a solid electrolyte layer 31 containing conductive polymer particles 31*a* which is provided between and in contact with the organic conductive layer 14 of the cathode 10 and the dielectric layer 22 of the anode 20, and an electrolytic solution 32 filled between the conductive polymer particles 31*a* in the solid electrolyte layer 31.

13 Claims, 2 Drawing Sheets

(56) References Cited

U.S. PATENT DOCUMENTS

| | | | |
|---|---|---|---|
| 10,790,095 B2 * | 9/2020 | Tsuda | H01G 9/145 |
| 10,854,393 B2 * | 12/2020 | Koseki | H01G 9/052 |
| 2002/0080558 A1 | 6/2002 | Nonaka et al. | |
| 2008/0002334 A1 * | 1/2008 | Kakuma | H01G 9/151 |
| | | | 29/25.03 |
| 2011/0170229 A1 | 7/2011 | Imamura et al. | |
| 2013/0027847 A1 * | 1/2013 | Aoyama | H01G 9/0029 |
| | | | 29/25.03 |
| 2017/0294273 A1 | 10/2017 | Andoralov et al. | |
| 2018/0047511 A1 * | 2/2018 | Tsuda | H01G 9/04 |
| 2018/0218844 A1 * | 8/2018 | Sato | H01G 9/151 |
| 2019/0115160 A1 * | 4/2019 | Koseki | H01G 9/035 |
| 2019/0304704 A1 * | 10/2019 | Ishimaru | H01G 9/0029 |
| 2023/0017930 A1 * | 1/2023 | Koseki | H01G 9/055 |

FOREIGN PATENT DOCUMENTS

| | | | | |
|---|---|---|---|---|
| JP | 11-186110 A | | 7/1999 | |
| JP | 2000-114109 A | | 4/2000 | |
| JP | 2001-189242 A | | 7/2001 | |
| JP | 2001-196270 A | | 7/2001 | |
| JP | 2001-297952 A | | 10/2001 | |
| JP | 2005-109270 A | | 4/2005 | |
| JP | 2006-190878 A | | 7/2006 | |
| JP | 2007-95865 A | | 4/2007 | |
| JP | 2008-10657 A | | 1/2008 | |
| JP | 2016-105497 A | | 6/2016 | |
| JP | 2017188655 A | * | 10/2017 | ......... H01G 9/0029 |
| JP | 2019-516241 A | | 6/2019 | |
| WO | WO-2014098006 A1 | * | 6/2014 | ......... H01G 9/0036 |
| WO | WO 2016/174806 A1 | | 11/2016 | |
| WO | WO-2019069917 A1 | * | 4/2019 | ............ H01G 11/02 |
| WO | WO-2019230676 A1 | * | 12/2019 | |

OTHER PUBLICATIONS

Written Opinion of the International Searching Authority (PCT/ISA/237) issued in PCT/JP2020/046800, dated Mar. 23, 2021.

* cited by examiner

Fig.2

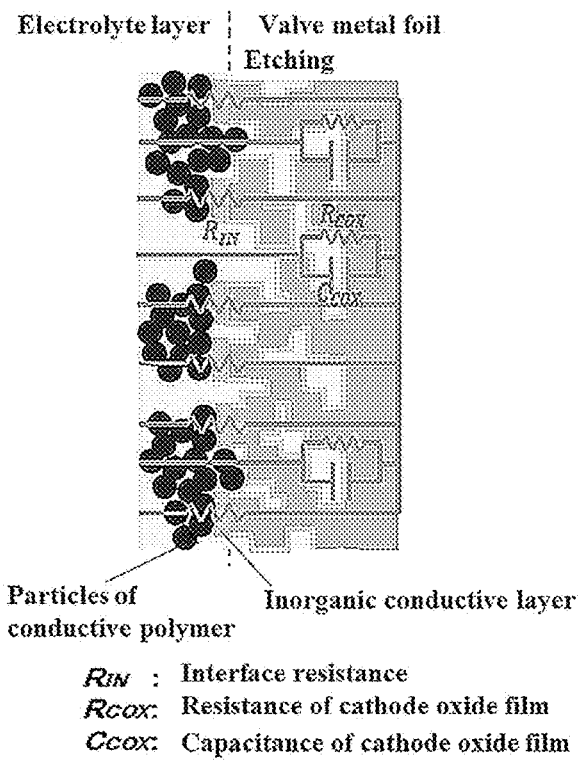

$R_{IN}$ : Interface resistance
$R_{COX}$: Resistance of cathode oxide film
$C_{COX}$: Capacitance of cathode oxide film

Fig.3

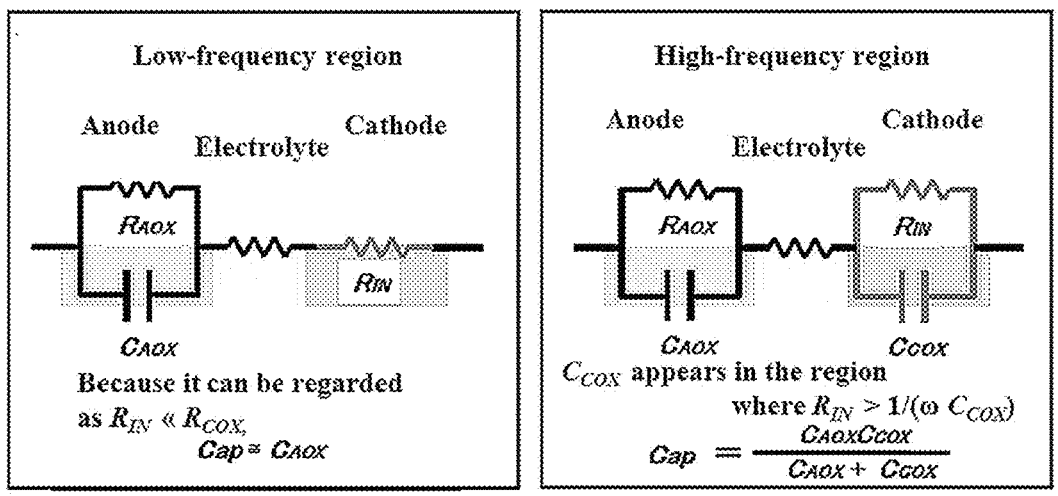

$R_{IN}$ : Interface resistance
$R_{COX}$: Resistance of cathode oxide film
$C_{COX}$: Capacitance of cathode oxide film
$R_{AOX}$: Resistance of anode oxide film
$C_{AOX}$: Capacitance of anode oxide film
$C_{cap}$ : Capacitance of capacitor
$\omega = 2\pi f$   f: Frequency

HYBRID ELECTROLYTIC CAPACITOR AND METHOD FOR MANUFACTURING SAME

TECHNICAL FIELD

The present invention relates to a hybrid electrolytic capacitor with a composite electrolyte layer having a solid electrolyte layer containing a conductive polymer and an electrolytic solution impregnated in gaps in the solid electrolyte layer, and a method for manufacturing the same.

THE RELATED ART

As electronic devices become smaller and faster, capacitors that are used in power supply circuits or the like are required to have high capacitance, low equivalent series resistance (hereinafter referred to as "ESR"), excellent high-frequency characteristics and excellent high-temperature durability. Among electrolytic capacitors comprising: an anode having an oxide film as a dielectric on a surface of a substrate which is composed of a valve metal such as aluminum, tantalum, and niobium and has an enlarged surface; an electrolyte in contact with the oxide film that acts as a true cathode; and a cathode (apparent cathode) which is composed of a valve metal and is in contact with the electrolyte, a solid electrolytic capacitor using as the electrolyte a conductive polymer with high conductivity and a high thermal decomposition temperature which is derived from a monomer with a π-conjugated double bond such as a substituted or unsubstituted thiophene, pyrrole, and aniline is suitable for meeting the abovementioned requirements. However, the solid electrolytic capacitor has a problem that the leakage current gradually increases due to poor repair action of the defective part of the oxide film as a dielectric. To solve this problem, a so-called hybrid electrolytic capacitor in which gaps in the solid electrolyte layer is impregnated with an electrolytic solution with excellent oxide film repair properties has been proposed. An electrolytic capacitor with an electrolyte layer composed solely of a conductive polymer is hereinafter referred to as a "solid electrolytic capacitor" and an electrolytic capacitor with a composite electrolyte layer that has a solid electrolyte layer containing a conductive polymer and an electrolytic solution impregnated in gaps in the solid electrolyte layer is hereinafter referred to as a "hybrid electrolytic capacitor."

For example, Patent Document 1 (JP H11-186110 A) discloses a hybrid electrolytic capacitor obtained by forming a conductive polymer layer in a capacitor element consisting of a anode foil with chemical conversion treatment and an opposing cathode foil wound through a separator and then being impregnated with an electrolytic solution, in which document the conductive polymer layer is formed by chemical polymerization. It has also been shown that the leakage current of this hybrid electrolytic capacitor is significantly smaller than that of a solid electrolytic capacitor with an electrolyte layer composed solely of a conductive polymer, both before and after a high temperature loading test at 105 degrees centigrade for 1,000 hours. Also, Patent Document 2 (JP 2008-010657 A) discloses a hybrid electrolytic capacitor obtained by forming a conductive polymer layer by impregnating a dispersion liquid containing particles of a conductive polymer and a solvent into a capacitor element consisting of an anode foil on which a dielectric oxide film is formed and an opposing cathode foil wound through a separator and drying the capacitor element, and then by impregnating gaps in the conductive polymer layer with an electrolytic solution. It has been shown that the leakage current of this hybrid electrolytic capacitor is far smaller than that of a hybrid electrolytic capacitor in which the conductive polymer layer is formed by chemical polymerization, and the reason for this is that the conductive polymer does not penetrate into the defective area of the dielectric oxide film, but instead the electrolytic solution penetrates thereinto, resulting in a higher repair effect on the dielectric oxide film. Also, it has been shown that the hybrid electrolytic capacitor described in this document shows an increase in capacitance at a frequency of 120 Hz due to the conductive polymer penetrating into the etched pores of the anode, and further a decrease in ESR at a frequency of 100 kHz due to the impregnation of the electrolytic solution.

A natural oxide film generally exists on the surface of the cathode composed of a valve metal in the solid electrolytic capacitor even without treatment to provide an oxide film. Therefore, as shown in Equation (1) below, the capacitance of the solid electrolytic capacitor (C) is the combined capacitance of an anode capacitance (Ca) and a cathode capacitance (Cc), and even if the anode capacitance is increased by the etching process, the capacitance of the solid electrolytic capacitor will be smaller than the anode capacitance as long as the cathode has a capacitance.

$$C = \frac{1}{\frac{1}{Ca} + \frac{1}{Cc}} \quad (1)$$

Therefore, etching has also been applied to the valve metal foil of the cathode in order to increase the cathode capacitance in the solid electrolytic capacitors. However, there is a limit to increasing the cathode capacitance by etching and maintaining the cathode capacitance, because excessive etching simultaneously causes dissolution of the surface of the valve metal foil, which in turn hinders the increase in the surface enlargement ratio, and an oxide film is easily formed on the surface of the valve metal foil. Therefore, a method has been proposed to increase the cathode capacitance and suppress the growth of the oxide film by forming on the surface of the valve metal foil of the cathode a film of conductive material which is resistant to the formation of oxide film.

For example, Patent Document 3 (JP 2000-114109 A) discloses a solid electrolytic capacitor with a cathode foil in which a chemical oxide film is formed on the surface of an etched valve metal foil, and a film consisting of a metal nitride such as TiN, ZrN, and TaN that is difficult to form an oxide film on the surface is further formed on the chemical oxide film by vapor deposition. It is explained that the deposition of a metal nitride removes part of the chemical oxide film and makes the metal nitride and the valve metal foil conductive, so that the cathode capacitance becomes infinite and the capacitance of the capacitor (C) expressed in the above equation becomes maximized, that is, equal to the anode capacitance (Ca). A solid electrolytic capacitor that uses other materials in place of the metal nitride film is also known to achieve the same effect; for example, Patent Document 4 (JP 2005-109270 A) discloses a solid electrolytic capacitor with a cathode foil in which a film of a metal carbide with low specific electrical resistance such as TiC, WC, and ZrC is formed by vapor deposition, Patent Document 5 (JP 2006-190878 A) discloses a solid electrolytic capacitor with a cathode in which a carbon film is formed on the surface of a valve metal by a dry plating method such as ion plating method, and Patent document 6 (JP 2007-095865 A) discloses a cathode foil in which a carbon film is formed by a coating method.

In a hybrid electrolytic capacitor, the capacitance of the capacitor (C) is also the combined capacitance of an anode capacitance (Ca) and a cathode capacitance (Cc) as shown in the abovementioned equation (1), so it has been proposed to make the cathode capacitance closer to infinity using the method shown in Patent Documents 3 to 6, and to bring the capacitance of the capacitor (C) expressed in the above equation to be closer to the anode capacitance (Ca).

For example, Patent Document 7 (WO 2016/174806 A1) discloses a hybrid electrolytic capacitor with a cathode foil in which an inorganic conductive layer containing an inorganic conductive material such as carbon, nickel, a nickel nitride, a nickel carbide, titanium, a titanium nitride and a titanium carbide is formed by vapor deposition or coating methods. In this document, a problem mentioned includes that, when a solid electrolyte layer is formed between an anode foil and an cathode foil by using a polymerization solution containing a raw material of a conductive polymer, the conductive polymer film becomes too dense for the electrolytic solution to spread easily over the surface of the anode foil and thus a missing dielectric layer becomes difficult to repair, so the solid electrolyte layer is formed by using a dispersion liquid in which fine conductive polymer participles are dispersed in a dispersing medium or a solution in which a conductive polymer is dissolved in a solvent. Another problem mentioned is that, although the resulting solid electrolyte layer is homogeneous and flexible and retains the electrolytic solution well, adhesion between the solid electrolyte layer and the anode or cathode foil is low, and especially when an electrolytic solution is used, contact between the inorganic conductive layer and the solid electrolyte layer is easily disturbed because the electrolytic solution is soaked between them, which makes it difficult to achieve higher capacitance and lower ESR of the capacitor, therefore, adhesion between the solid electrolyte layer and the inorganic conductive layer is improved by roughening the surface of the cathode foil by etching or other methods and then forming the inorganic conductive layer. The capacitance at a frequency of 120 Hz and the ESR at a frequency of 100 kHz were measured for the hybrid electrolytic capacitor obtained, and it was reported that a higher capacitance and a lower ESR of a capacitor were achieved.

PRIOR ARTS DOCUMENTS

Patent Documents

Patent Document 1: JP H11-186110 A
Patent Document 2: JP 2008-010657 A
Patent Document 3: JP 2000-114109 A
Patent Document 4: JP 2007-095865 A
Patent Document 5: JP 2006-190878 A
Patent Document 6: JP 2007-095865 A
Patent Document 7: WO 2016/174806 A1

SUMMARY OF THE INVENTION

Problems to be Solved by the Invention

Although the problem of increased leakage current in a solid electrolytic capacitor is solved with a hybrid electrolytic capacitor, and high capacitance is achieved by adding an inorganic conductive layer to a cathode of this capacitor, the evaluation of capacitance of the hybrid electrolytic capacitor has generally been conducted only at the frequency of 120 Hz shown in Patent Documents 2 and 7, and evaluation at high frequencies was not sufficient. The inventors measured the capacitance at the frequency of 20 kHz of a hybrid electrolytic capacitor having a similar configuration to the capacitor of Patent Document 7, which has a cathode in which a titanium carbide film or carbon deposition film as an inorganic conductive layer is formed on an etched valve metal foil and found that both capacitors showed relatively low capacitances and should be improved. Also, ESR measurements of the abovementioned hybrid electrolytic capacitors under the frequencies of 20 kHz and 100 kHz showed that both capacitors exhibited relatively high ESR values and marked increases in ESR after high temperature endurance testing, which indicates that they should still be improved. However, hybrid electrolytic capacitors are also required to have high capacitance, low ESR, excellent high-frequency characteristics and excellent high-temperature durability, as mentioned above.

Therefore, the objective of the present invention is to provide a hybrid electrolytic capacitor that can meet the abovementioned needs.

Means for Solving Problems

The reasons why the hybrid electrolytic capacitors of the prior art documents, which have the cathode in which an inorganic conductive layer is formed on a valve metal foil, achieve higher capacitance at a frequency of 120 Hz but not at a frequency of 20 kHz, are explained using FIGS. 2 and 3. FIG. 2 illustrates the resistance and capacitance components at and near the cathode of a hybrid electrolytic capacitor with a configuration similar to the configurations in the prior art documents, and FIG. 3 illustrates the configuration of the equivalent circuit of the hybrid electrolytic capacitor in low and high frequency regions. The capacitance of the capacitor indicated by C in equation (1) above is shown using the symbol Cap in FIG. 3, the anode capacitance indicated by Ca in equation (1) above is shown using the symbol $C_{AOX}$ in FIG. 3, and the anode capacitance indicated by Cc in equation (1) above is shown using the symbol $C_{COX}$ in FIG. 3.

As shown in FIG. 2, the circuit configuration at and near the cathode of the hybrid electrolytic capacitor can be illustrated by the interface resistance $R_{IN}$, the resistance of the cathode oxide film $R_{COX}$, and the capacitance of the cathode oxide film $C_{COX}$, which are connected in parallel. Since the resistance of the cathode oxide film $R_{COX}$ is generally significantly larger than the interface resistance $R_{IN}$ in the region of low frequency f, the equivalent circuit of the hybrid electrolytic capacitor is simplified as shown in the left diagram of FIG. 3. As a result, the capacitance of the capacitor Cap is approximately equal to the capacitance of the anode oxide film $C_{AOX}$, and higher capacitance is achieved as shown in the prior art documents. However, in the region of high frequency f, $R_{IN}$ becomes larger than $1/(\omega C_{COX})$ and $C_{COX}$ appears, and thus the equivalent circuit of the hybrid electrolytic capacitor is as shown in the right diagram of FIG. 3. As a result, the capacitance of the capacitor Cap is the composite capacitance of the capacitance of the anode oxide film $C_{AOX}$ and the capacitance of the cathode oxide film $C_{COX}$, which is smaller than the capacitance of the anode oxide film $C_{AOX}$.

Therefore, as a method to reduce the interface resistance $R_{IN}$, that is, to obtain the equivalent circuit as shown in the left diagram of FIG. 3 even in the high-frequency region, the inventors considered forming a conductive polymer layer with low electrolyte impregnation on the inorganic conductive layer of the cathode, which had not been adopted in conventional hybrid electrolytic capacitors. The inventors have confirmed that the region where the resistance of the cathode oxide film $R_{COX}$ becomes significantly larger than the interface resistance $R_{IN}$ can be extended to the high-frequency region, that higher capacitance can be achieved even in the high-frequency region, and furthermore, that the obtained capacitor shows low ESR values both before and after the high-temperature load test, and thus have completed the present invention. Moreover, the effects described above have been found to be independent of the presence or absence of etching and the type of inorganic conductive layer.

Therefore, the present invention relates to a hybrid electrolytic capacitor comprising:

a cathode comprising a cathode substrate composed of a valve metal, an oxide layer composed of an oxide of the valve metal provided on a surface of the cathode substrate, an inorganic conductive layer having an inorganic conductive material provided on a surface of the oxide layer, and an organic conductive layer having a conductive polymer provided on a surface of the inorganic conductive layer;

an anode comprising an anode substrate composed of a valve metal, and a dielectric layer composed of an oxide of the valve metal that composes the anode substrate and provided on a surface of the anode substrate; and a composite electrolyte layer comprising a solid electrolyte layer having conductive polymer particles that is provided between and in contact with the organic conductive layer of the cathode and the dielectric layer of the anode, and an electrolytic solution filled between the conductive polymer particles in the solid electrolyte layer.

In the present invention, the cathode substrate may be with or without an etching pit, and if an etching pit exists, it may be a tunnel pit or sponge-like pit, a through pit or residual core pit. Also, the oxide layer on the surface of the cathode substrate may be a chemical oxide film or a natural oxide film.

The present invention is characterized by forming the organic conductive layer having a conductive polymer in the cathode. The organic conductive layer is preferably dense, specifically in the range of 1.15 to 1.80 g/cm$^3$, preferably in the range of 1.20 to 1.80 g/cm$^3$, and especially preferably in the range of 1.60 to 1.80 g/cm$^3$. The abovementioned dense organic conductive layer in contact with the composite electrolyte layer suitably gives high capacitance, low ESR, excellent high-frequency characteristics and excellent high-temperature durability of the hybrid electrolytic capacitor. If the density of the organic conductive layer of the cathode is less than 1.15 g/cm$^3$, it is difficult to obtain the effect of the present invention, and it is difficult to produce a conductive polymer layer with a density exceeding 1.80 g/cm$^3$. The density in the dense organic conductive layer described above is high compared to the density of the solid electrolyte layer with the electrolytic solution retained, and thus most of the electrolytic solution in the composite electrolyte layer will be retained in the solid electrolyte layer.

The organic conductive layer in the cathode can be formed on the inorganic conductive layer with good adhesion by electrolytic polymerization using a component consisting of the cathode substrate, the oxide layer and the inorganic conductive layer as a working electrode. Therefore, in a suitable embodiment of the present invention, the organic conductive layer is an electropolymerized film. In this specification, the component consisting of the cathode substrate, the oxide layer and the inorganic conductive layer may be referred to as a "support," and the component consisting of the cathode substrate and the oxide layer may be referred to as a "current collector."

The composite electrolyte layer can be obtained by the same method as a conventional method, that is, by filling a dispersion liquid containing conductive polymer particles and a dispersion medium between the dielectric layer of the anode and the organic conductive layer of the cathode and drying it to form a solid electrolyte layer, and then by impregnating the solid electrolyte layer obtained with an electrolytic solution.

Therefore, the present invention also relates to a method for manufacturing a hybrid electrolytic capacitor comprising:

a cathode formation process having a step of forming an inorganic conductive layer using an inorganic conductive material on a surface of an oxide layer composed of an oxide of a valve metal formed on a surface of a cathode substrate composed of the valve metal, and a step of forming an organic conductive layer having a conductive polymer on a surface of the inorganic conductive layer via electrolytic polymerization of a monomer having a n-conjugated double bond;

an anode formation process of forming a dielectric layer by oxidizing a surface of an anode substrate composed of a valve metal; and a complex electrolyte layer formation process having a step of forming a solid electrolyte layer by filling a dispersion liquid with conductive polymer particles and a dispersion medium between the organic conductive layer of the cathode and the dielectric layer of the anode and drying the dispersion liquid, and a step of impregnating the solid electrolyte layer with an electrolytic solution. The organic conductive layer with a density of 1.15 to 1.80 g/cm$^3$ is suitably formed by using an electrolytic polymerization solution comprising a solvent that has 100 to 80 mass % of water and 0 to 20 mass % of an organic solvent, a monomer having a π-conjugated double bond, and a supporting electrolyte.

There are no special limitations on the type of conductive polymer in the organic conductive layer and the type of conductive polymer in the solid electrolyte layer, and a heretoknown conductive polymer derived from a monomer having a π-conjugated double bond can be applied. Both conductive polymers can be the same type of polymer (derived from the same monomer) or different types of polymers (derived from different monomers), but it is preferable if both are poly(3,4-ethylenedioxythiophene), as it provides particularly high conductivity and excellent heat resistance.

As mentioned above, the effects of the present invention can be obtained regardless of the presence or absence of etching on the cathode substrate or the type of inorganic conductive layer. However, it is preferred that the inorganic conductive material in the inorganic conductive layer is carbon because the capacitance change before and after the high-temperature load test is small both in the low-frequency region and in the high-frequency region.

In PCT/JP2019/022741, which was unpublished at the time of filing of the application on which the priority claim of this application is based, the applicant discloses an electrode body having suitable capacitance used for a cathode of an electrolytic capacitor that has a cathode body composed of a valve metal and having an enlarged surface layer and a carbon layer formed on the enlarged surface layer, and is characterized in that the boundary between the enlarged surface layer and the carbon layer has an uneven shape, and further discloses a method of manufacturing the electrode body with suitable performance, in which a slurry containing carbon particles is applied to the surface of the cathode body, dried, and then subjected to a pressing process. When this method is performed by using an etched aluminum foil as a substrate, the pressing process can push the carbon particles into the etching pit in the aluminum foil and also make the carbon particles break through an oxide film on the aluminum foil to conduct between the carbon layer and the substrate aluminum.

PCT/JP2019/022741 details the performance of a wet electrolytic capacitor using the electrode body as a cathode, but it does not describe the capacitor performance when the electrode body is applied for a hybrid electrolytic capacitor. The inventors evaluated the performance of the hybrid electrolytic capacitor obtained by using the abovementioned electrode body with suitable performance as a support for obtaining the organic conductive layer in the cathode by electrolytic polymerization, and found that the capacitance change before and after the high-temperature load test was particularly small both in the low-frequency region and in the high-frequency region. Therefore, in a particularly preferred embodiment in the hybrid electrolytic capacitor of the present invention, the cathode substrate has an etching pit, and the inorganic conductive layer is a carbon coating layer having carbon particles, wherein the carbon coating layer has an entry area entering the etching pit and a penetration area penetrating through the oxide layer and conducting with the cathode substrate.

Advantageous Effects of the Invention

The hybrid electrolytic capacitor of the present invention exhibits high capacitance, low ESR, excellent high-frequency characteristics, and excellent high-temperature durability.

BRIEF DESCRIPTION OF THE DRAWINGS

FIG. 2 illustrates resistance components and capacitance components at and near a cathode of a prior art hybrid electrolytic capacitor.

FIG. 3 illustrates equivalent circuit configurations in the low-frequency region and in the-high frequency region in a prior art hybrid electrolytic capacitor.

DETAILED DESCRIPTION OF THE INVENTION

Figure 1:
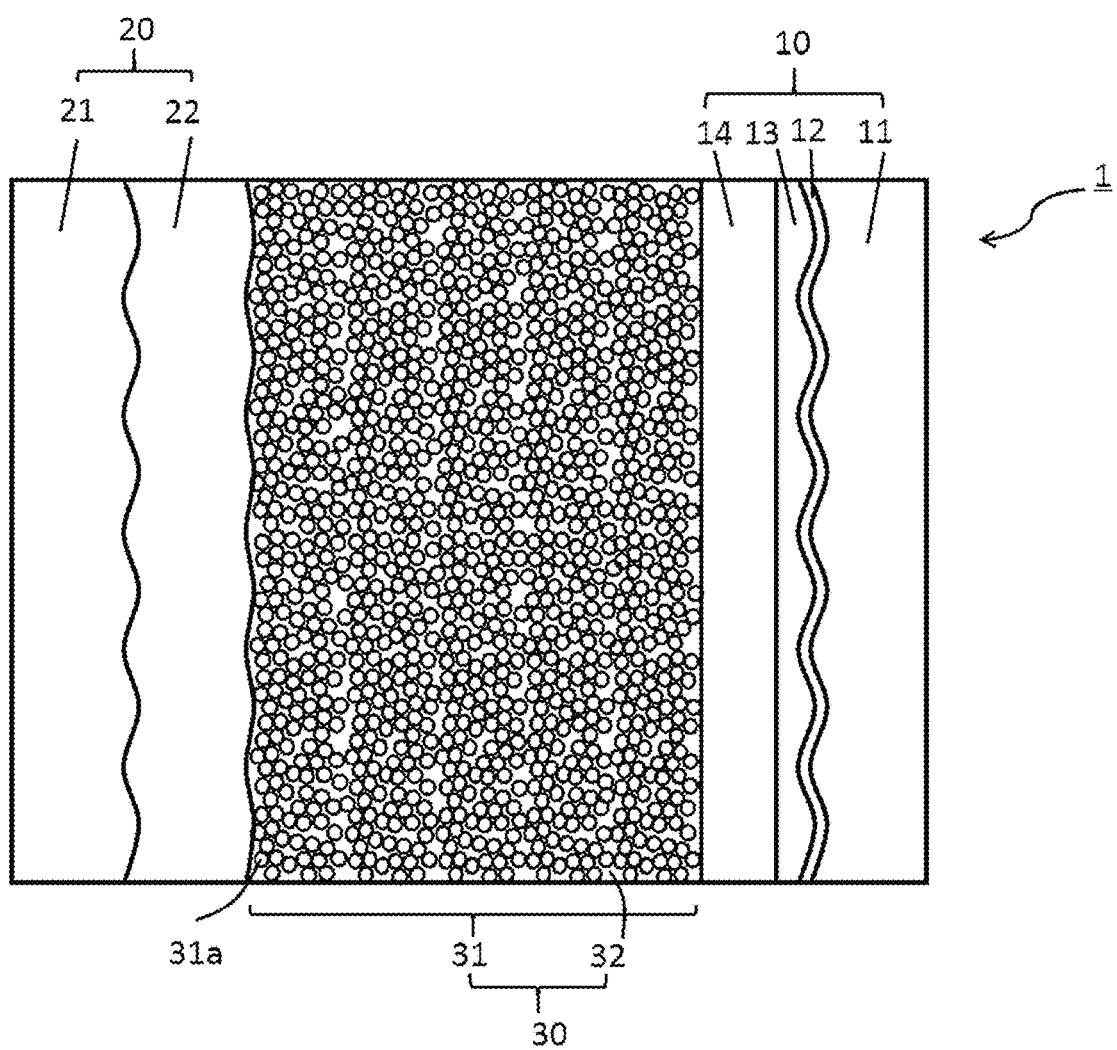
FIG. 1 is a conceptual diagram that schematically describes a structure of a hybrid electrolytic capacitor of the present invention.

The structure of the hybrid electrolytic capacitor of the present invention is schematically shown in FIG. 1. The hybrid electrolytic capacitor 1 comprises: a cathode 10 comprising a cathode substrate 11 composed of a valve metal, an oxide layer 12 composed of an oxide of the valve metal that is formed on a surface of the cathode substrate 11, an inorganic conductive layer 13 having an inorganic conductive material which is formed on a surface of the oxide layer 12, and an organic conductive layer 14 having a conductive polymer which is provided on a surface of the inorganic conductive layer 13; an anode 20 comprising an anode substrate 21 composed of a valve metal, and a dielectric layer 22 composed of an oxide of the valve metal that composes the anode substrate and provided on a surface of the anode substrate 21; and a composite electrolyte layer 30 comprising a solid electrolyte layer 31 having conductive polymer particles 31a that is provided between and in contact with the organic conductive layer 14 of the cathode 10 and the dielectric layer 22 of the anode 20, and an electrolytic solution 32 filled between the conductive polymer particles 31a in the solid electrolyte layer 31.

The organic conductive layer 14 having a conductive polymer in the cathode 10 is preferred to be dense, and it is preferable to have specially a density in the range of 1.15 to 1.80 $g/cm^3$, preferably a density in the range of 1.20 to 1.80 $g/cm^3$, and especially preferably a density in the range of 1.60 to 1.80 $g/cm^3$. The dense organic conductive layer 14 in contact with the composite electrolyte layer 30 suitably gives high capacitance, low ESR, excellent high-frequency characteristics and excellent high-temperature durability of the hybrid electrolytic capacitor 1. If the density of the organic conductive layer 14 in the cathode 10 is less than 1.15 $g/cm^3$, it is difficult to obtain the effect of the present invention, and it is difficult to produce a conductive polymer layer with a density exceeding 1.80 $g/cm^3$.

The hybrid electrolytic capacitor of the present invention can be manufactured by a method comprising: a cathode formation process; an anode formation process; and a composite electrolyte layer formation process, as described below. Each process is described in detail below.

(1) Cathode Formation Process

The cathode formation process has a step of forming an inorganic conductive layer using an inorganic conductive material on a surface of an oxide layer composed of an oxide of a valve metal formed on a surface of a cathode substrate composed of the valve metal, and a step of forming an organic conductive layer having a conductive polymer on a surface of the inorganic conductive layer via electrolytic polymerization of a monomer having a π-conjugated double bond.

As the cathode substrate, a substrate composed of a valve metal that has been used as a cathode substrate in conventional hybrid electrolytic capacitors can be used without any particular limitation. For example, a foil composed of a valve metal such as aluminum, tantalum, niobium, titanium, hafnium, zirconium, zinc, tungsten, bismuth and antimony can be used, and the aluminum foil is particularly preferred. As the cathode substrate, the foil can be used in the form of so-called plain foil without any etching treatment, or the foil with an increased surface area by chemical or electrochemical etching treatment can be used. An etching pit in the cathode substrate can be a tunnel pit or sponge-like pit, a through pit or residual core pit, and its form is selected according to the application usage of the hybrid electrolytic capacitor. The etching pit can be formed by using publicly known AC electrolysis methods and DC electrolysis methods.

The oxide layer formed on the surface of the cathode substrate can be a natural oxide film that generally exists on the surface of the cathode substrate, or additionally, a chemical oxide film can be formed on the surface of the cathode substrate by a chemical conversion treatment using a chemical conversion solution such as aqueous ammonium borate solution, aqueous ammonium adipate solution or aqueous ammonium phosphate solution, and the obtained chemical oxide film can be used as the oxide layer.

First, an inorganic conductive layer is formed on the surface of the oxide layer using an inorganic conductive material to obtain a support. The inorganic conductive layer may be one layer, or two or more inorganic conductive layers can be formed by using different inorganic conductive materials. The type of inorganic conductive material used to form the inorganic conductive layer and the method of forming the inorganic conductive layer have no special limitation as long as the inorganic conductive layer can ensure sufficient adhesion with the oxide layer in the cathode and an organic conductive layer can be formed with good adhesion on the surface of the inorganic conductive layer in the next step. For example, an inorganic conductive material such as carbon, titanium, platinum, gold, silver, cobalt, nickel, and iron can be layered on the oxide layer by means of vacuum deposition, sputtering, ion plating, coating, electroplating, electroless plating or other methods to provide the inorganic conductive layer. The use of carbon as the inorganic conductive material is preferred because the capacitance change before and after the high-temperature load test is small both in the low-frequency region and in the high-frequency region.

In a particularly suitable embodiment of the cathode, the cathode substrate has an etching pit, and the inorganic conductive layer is a carbon coating layer having carbon particles, which has an entry area entering the etching pit and a penetration area penetrating through the oxide layer and conducting with the cathode substrate. This particularly suitable inorganic conductive layer can be formed by carrying out a coating stage in which a carbon slurry having carbon particles is applied to the surface of the oxide layer and dried to form a slurry layer, and a pressing stage in which the slurry layer is pressed to push the carbon particles into the etching pit of the cathode substrate and to make the carbon particles penetrate through the oxide layer.

The carbon slurry used in the coating stage contains at least carbon particles, a binder, and a dispersing medium. As the carbon particles, carbon particles having various shapes such as fibrous, spherical, and scale shapes can be used without limitation. Examples include carbon nanotubes, carbon nanofibers, carbon nanohorns, porous carbon such as activated carbon, carbon black such as Ketjen black, furnace black, channel black and acetylene black, amorphous carbon, natural graphite, artificial graphite, graphitized Ketjen black, and mesoporous carbon. The carbon particles may be used alone or in a mixture of two types or more. However, the carbon slurry for forming the carbon coating layer with an entry area entering the etching pit naturally contains at least carbon particles having a particle size that is capable of entering the etching pit of the cathode substrate. In a suitable embodiment, the carbon slurry further contains carbon particles with a particle size that is impossible to enter the etching pit of the cathode substrate. In this suitable embodiment, the carbon particles may be composed of the same type of carbon. In other words, the same type of carbon with a wide particle size distribution, e.g., acetylene black with a wide particle size distribution can be used. Further, a mixture of different types of carbon, e.g., a mixture of scale graphite and acetylene black can be used to obtain a wide particle size distribution of carbon particles.

As the binder, a known binder such as polytetrafluoroethylene, polyvinylidene fluoride, tetrafluoroethylene-hexafluoropropylene copolymer, polyvinyl fluoride, carboxymethyl cellulose, and styrene butadiene rubber can be used alone or two or more types can be mixed together. As the dispersing medium, a dispersing medium that does not adversely affect other components such as N-methylpyrrolidone, dimethylformamide, tetrahydrofuran, isopropyl alcohol, and water can be used without limitation.

A wet mixing method of the carbon particles, the binder, and the dispersing medium to obtain the carbon slurry is not limited, and wet mixing can be done by hand mixing using a mortar, or by using a known mixing device such as a stirrer or homogenizer. There is no special limitation on the mixing time as long as a uniform carbon slurry is obtained.

The carbon slurry obtained is applied to the surface of the oxide layer that is formed on the surface of the cathode substrate under normal or reduced pressure using a known coating method such as a doctor blade method and a casting method and dried to form a slurry layer. Then, a pressing stage is performed to apply pressure to the obtained slurry layer.

Before the carbon slurry is applied, a base layer composed of a conductive inorganic material such as carbon, titanium nitride, or titanium carbide can be provided on the surface of the oxide layer by a vapor deposition method such as vacuum deposition and ion plating. The base layer formed by the vapor deposition method is formed only on the surface of the oxide layer on the outer surface of the cathode substrate and not on the surface of the oxide layer on the surface of the etching pit.

The pressing stage can be performed by a roll press or vertical press, but pressure must be applied to push the carbon particles into the etching pit of the cathode substrate and to make the carbon particles penetrate through the oxide layer. If the base layer is formed on the outer surface of the cathode substrate, pressure must be applied to make the carbon particles penetrate through the base layer and the oxide layer. The pressure in the pressing stage is preferably adjusted so that the interface resistance at the support is 10 $m\Omega cm^2$ or less, preferably 6 $m\Omega cm^2$ or less, more preferably 3 $m\Omega cm^2$ or less, and an average length of the entry area in the carbon coating layer is one fifth or more, preferably one fourth or more of an average length of the etching pit. The "interface resistance at the support" means the interface resistance measured between the carbon coating layer and the cathode substrate, which depends on all interfaces contained in the support, and can be obtained by known measurement methods, for example, by the following method. First, a support with a carbon coating layer having a thickness of 20 to 30 µm is formed. Next, a probe equipped with an array consisting of a plural test needles for measuring the potentials at many positions on the surface of the carbon coating layer and an array consisting of test needles for applying an electric current to the support that is provided around the array consisting of a plural test needles for measuring the potentials is brought into contact with the surface of the carbon coating layer, and the actual measurement of the potential distribution is obtained by applying a predetermined DC current between the test needles for applying an electric current and measuring the potentials generated on the surface of the carbon coating layer at many positions by the test needles for measuring the potentials during the application of the current. Next, a model equation is constructed using the measured current collector thickness, current collector resistance and carbon coating layer thickness as fixed values, and using the carbon coating layer resistance and interface resistance as variables, and the potential distribution in the model equation is calculated while changing the variables. The interface resistance when the calculated value of the potential distribution obtained from the model equation agrees with the measured value of the potential distribution is the "interface resistance at the support". A suitable device for obtaining the interface resistance at the support is, for example, the electrode resistance measurement system RM2610 manufactured by Hioki E.E. CORPORATION. The thickness of the carbon coating layer is not limited as long as the entire surface of the oxide layer and cathode substrate which is to be coated by the carbon coating layer is coated by the carbon coating layer. For example, an average thickness of the carbon coating layer can be 0.5 to 30 μm. In the measurement method using the potential distribution described above, a carbon coating layer with a thickness of 20 to 30 μm is used. The values of interface resistance of a support obtained by pressing a thinner carbon coating layer at the same pressure are similar to those of a support with a carbon coating layer of 20 to 30 μm thickness.

If the carbon coating layer contains carbon particles with a particle size that is impossible to enter the etching pit, these particles are essentially present in the area except for the entry area of the carbon coating layer, and they play a role in compressing and deforming the etching pit during the pressing stage to suitably improve the adhesion between the carbon coating layer and the current collector in contact with it and suitably reduce the interface resistance between the carbon coating layer and the current collector. The particles with a particle size that is impossible to enter the etching pit also play the role of suitably pushing carbon particles with a particle size that is capable of entering the etching pit into the etching pit. On the other hand, the carbon particles with a particle size that can enter the etching pit are present not only in the entry area of the carbon coating layer, but throughout the carbon coating layer by filling gaps between the larger carbon particles that are present only in the area excluding the entry area. When the carbon particles having a particle size that cannot enter the etching pit are composed of scale graphite, the etching pit is easily compressed and deformed because pieces of scale graphite are oriented so that their basal planes overlap each other, and the pieces of scale graphite easily penetrate through the oxide layer and conduct with the cathode substrate. In addition, when scale graphite and carbon black are used concurrently, carbon black is easily pushed into the etching pit and between the scale graphite, forming an inorganic conductive layer that is particularly dense, highly conductive, and has excellent adhesiveness with the current collector.

An organic conductive layer having a conductive polymer is then formed on the surface of the abovementioned inorganic conductive layer. The organic conductive layer is preferably dense, specifically in the range of 1.15 to 1.80 g/cm$^3$, preferably in the range of 1.20 to 1.80 g/cm$^3$, and especially in the range of 1.60 to 1.80 g/cm$^3$. If a dense organic conductive layer with a density in this range is formed, there is no particular limitation on the method of formation, but this dense organic conductive layer can be suitably obtained via electrolytic polymerization.

Electrolytic polymerization is performed by introducing the support consisting of the cathode substrate, the oxide layer and the inorganic conductive layer as a working electrode, together with a counter electrode such as a platinum plate or nickel plate, into a polymerization solution containing at least a monomer, a support electrolyte and a solvent, and applying a voltage between the working electrode and the counter electrode. In the process of electrolytic polymerization, an anion released from the support electrolyte is included in the conductive polymer layer as a dopant.

As the solvent for the polymerization solution for electrolytic polymerization, any solvent that can dissolve the desired amount of monomer and supporting electrolyte and does not adversely affect the electrolytic polymerization can be used. To obtain the dense organic conductive layer with a density in the range of 1.15 to 1.80 g/cm$^3$, a solvent having 10 to 80 mass % of water and 0 to 20 mass % of an organic solvent (hereinafter referred to as a "water-rich solvent") is preferably used. Examples of the organic solvent to be mixed with water include methanol, ethanol, isopropanol, butanol, ethylene glycol, acetonitrile, acetone, tetrahydrofuran, and methyl acetate. The density of the organic conductive layer increases as the water content in the solvent increases, and when water is used as the only solvent, the particularly desirable organic conductive layer with a density in the range of 1.60 to 1.80 g/cm$^3$ can be obtained.

As the monomer, a monomer having a π-conjugated double bond that is conventionally used for the production of a conductive polymer can be used without limitation. Representative monomers are exemplified below. The monomer may be used alone or as a mixture of two or more kinds of monomers.

First, thiophene and thiophene derivatives, including 3-alkylthiophenes such as 3-methylthiophene and 3-ethylthiophene, 3,4-dialkylthiophenes such as 3,4-dimethylthiophene and 3,4-diethylthiophene, 3-alkoxythiophenes such as 3-methoxythiophene and 3-ethoxythiophene, 3,4-dialkoxythiophenes such as 3,4-dimethoxythiophene and 3,4-diethoxythiophene, 3,4-alkylenedioxythiophenes such as 3,4-methylenedioxythiophene, 3,4-ethylenedioxythiophene and 3,4-(1,2-propylenedioxy) thiophene, 3,4-alkyleneoxythiathiophenes such as 3,4-methyleneoxythiathiophene, 3,4-ethyleneoxythiathiophene, and 3,4-(1,2-propyleneoxythia) thiophene, 3,4-alkylenedithiathiophenes such as 3,4-methylenedithiathiophene, 3,4-ethylenedithiathiophene and 3,4-(1,2-propylenedithia) thiophene, and alkylthieno[3,4-b]thiophenes such as thieno[3,4-b]thiophene, isopropylthieno[3,4-b]thiophene and t-butyl-thieno [3,4-b]thiophene, are exemplified.

Also, pyrrole and pyrrole derivatives, including N-alkylpyrroles such as N-methylpyrrole and N-ethylpyrrole, 3-alkylpyrroles such as 3-methylpyrrole and 3-ethylpyrrole, 3-alkoxypyrroles such as 3-methoxypyrrole and 3-ethoxypyrrole, N-phenylpyrrole, N-naphthylpyrrole, 3,4-dialkylpyrroles such as 3,4-dimethylpyrrole and 3,4-diethylpyrrole, and 3,4-dialkoxypyrroles such as 3,4-dimethoxypyrrole and 3,4-diethoxypyrrole, are exemplified. Further, aniline and aniline derivatives, including 2,5-dialkylanilines such as 2,5-dimethylaniline and 2-methyl-5-ethylaniline, 2,5-dialkoxyanilines such as 2,5-dimethoxyaniline and 2-methoxy-5-ethoxyaniline, 2,3,5-trialkoxyanilines such as 2,3,5-trimethoxyaniline and 2,3,5-triethoxyaniline, and 2,3,5,6-tetraalkoxyanilines such as 2,3,5,6-tetramethoxyaniline and 2,3,5,6-tetraethoxyaniline, and furan and furan derivatives, including 3-alkylfurans such as 3-methylfuran and 3-ethylfuran, 3,4-dialkylfurans such as 3,4-dimethylfuran and 3,4-diethylfuran, 3-alkoxyfurans such as 3-methoxyfuran and 3-ethoxyfuran, and 3,4-dialkoxyfurans such as 3,4-dimethoxyfuran and 3,4-diethoxyfuran, can be exemplified.

As the monomer, a monomer selected from the group consisting of thiophenes having substituents at the 3-position and the 4-position is preferably used. The substituents at the 3 and 4 positions of the thiophene ring can form a ring with carbons at the 3 and 4 positions. In particular, 3,4-(ethylenedioxythiophene) is preferable because it provides a conductive polymer that exhibits high conductivity and excellent heat resistance.

As the supporting electrolyte, any compound that releases a dopant contained in a conventional conductive polymer can be used without limitation. Examples include inorganic acids such as boric acid, nitric acid and phosphoric acid, organic acids such as acetic acid, oxalic acid and citric acid, as well as sulfonic acids such as methanesulfonic acid, dodecyl sulfonic acid and p-toluenesulfonic acid, and their salts. Polycarboxylic acids such as polyacrylic acid, polymethacrylic acid and polymaleic acid, polysulfonic acids such as polystyrene sulfonic acid and polyvinyl sulfonic acid, and their salts can also be used as the supporting electrolyte. In addition, boron complexes such as borodisalicylic acid, borodioxalic acid, and borodimaronic acid, and sulfonylimidic acids, and their salts can also be used as the supporting electrolyte. Examples of the salts include alkali metal salts such as lithium salts, sodium salts and potassium salts, ammonium salts, and alkylammonium salts such as ethylammonium salts and butylammonium salts. Among them, at least one organic compound that does not have a sulfonic acid group or sulfonate group and has an anion having a molecular weight of 200 or more, especially borodisalicylic acid or its salt, sulfonylimidic acids and their salt, are preferred because they give a conductive polymer with excellent heat resistance. The supporting electrolyte may be used alone or in a mixture of two or more types, and depending on the type of supporting electrolyte, it is used in an amount below saturation solubility in the polymerization solution and in a concentration that provides sufficient current for electrolytic polymerization.

In addition to the monomer, the supporting electrolyte, and the solvent as essential components, the polymerization solution for electrolytic polymerization may contain other components that do not adversely affect electrolytic polymerization, such as an anionic surfactant to solubilize or emulsify the monomer in the water-rich solvent. As the anionic surfactant, any anionic surfactant that is stable in the water-rich solvent may be used without limitation. Typical anionic surfactants are exemplified below.

First, fatty acid salt type surfactants such as sodium laurate, sodium palmitate and sodium stearate can be exemplified. Next, amino acid type surfactants such as sodium lauroyl glutamate, sodium lauroyl aspartate and sodium lauroyl methylaminopropionate can be exemplified. Next, sulfuric ester type surfactants, for example, alkylsulfuric ester salts such as sodium dodecyl sulfate and sodium myristyl sulfate, and alkyl ether sulfuric ester salts such as sodium polyoxyethylene lauryl ether sulfonate and sodium polyoxyethylene alkyl ether sulfonate can be exemplified. Next, sulfonic acid type surfactants, for example, alkane sulfonates such as sodium decanesulfonate and sodium dodecanesulfonate, alkylbenzenesulfonates such as sodium octylbenzenesulfonate and sodium dodecylbenzenesulfonate, alkylnaphthalenesulfonates such as sodium isopropylnaphthalenesulfonate and sodium butylnaphthalenesulfonate, polymeric sulfonates such as sodium polystyrene sulfonate, olefin sulfonates such as sodium tetradecene sulfonate, sulfo fatty acid ester salts such as sodium dioctyl sulfosuccinate can be exemplified. Further, alkyl phosphate type surfactants such as sodium lauryl phosphate, sodium myristyl phosphate and sodium polyoxyethylene lauryl phosphate can be exemplified.

The anionic surfactant may be used alone or as a mixture of two or more types, in an amount sufficient to solubilize or emulsify the monomer. The anionic surfactant is preferably a sulfonic acid type surfactant and/or a sulfuric ester type surfactant because they lead to a hybrid electrolytic capacitor with excellent frequency characteristics.

The electrolytic polymerization is carried out by one of a potentiostatic method, a galvanostatic method, and a potential sweeping method. In the case of the potentiostatic method, a potential of 1.0 to 1.5 V against the saturated calomel electrode is suitable, depending on the kind of monomer, in the case of the galvanostatic method, a current value of 1 to 10000 µA/cm$^2$ is suitable, depending on the kind of monomer, and in the case of the potential sweeping method, it is preferable to sweep the range of 0 to 1.5 V against the saturated calomel electrode at a rate of 5 to 200 mV/sec, depending on the kind of monomer. The polymerization temperature is not strictly limited, but is generally in the range of 10 to 60 degrees centigrade. The polymerization time is not strictly limited, but generally range from 1 minute to 10 hours.

The thickness of the organic conductive layer generally ranges from 10 to 2000 nm, preferably from 35 to 700 nm, and especially preferably from 70 to 350 nm.

The organic conductive layer after electrolytic polymerization is washed with water, ethanol or the like and dried to obtain the cathode for the hybrid electrolytic capacitor of the present invention.

(2) Anode Formation Process

In the anode formation process, a dielectric layer is formed by oxidizing the surface of an anode substrate composed of a valve metal. As the anode substrate, a substrate composed of a valve metal that has been used as an anode substrate in conventional solid electrolytic capacitors can be used without any particular limitations. For example, a foil composed of a valve metal such as aluminum, tantalum, niobium, titanium, hafnium, zirconium, zinc, tungsten, bismuth, and antimony, with its surface area increased by a chemical or electrochemical etching treatment, can be used, and the aluminum foil is particularly preferred. An etching pit in the anode substrate may be a tunnel pit or sponge-like pit, a through pit or residual core pit, and the form is selected according to the application of the hybrid electrolytic capacitor. The etching pit can be formed by a known AC and DC electrolysis method. The dielectric layer on the surface of the anode substrate can be formed by a known method of applying a chemical conversion treatment to the anode substrate by using a chemical conversion solution such as aqueous ammonium borate solution, aqueous ammonium adipate solution and aqueous ammonium phosphate solution.

(3) Complex Electrolyte Layer Formation Process

The composite electrolyte layer formation process includes a step of forming a solid electrolyte layer by filling a dispersion liquid containing conductive polymer particles and a dispersing medium between the organic conductive layer of the cathode and the dielectric layer of the anode and drying the dispersion liquid, and a step of impregnating the solid electrolyte layer with an electrolytic solution.

Generally, a separator is placed between the organic conductive layer of the cathode and the dielectric layer of the anode, and the solid electrolyte layer in contact with both the organic conductive layer of the cathode and the dielectric layer of the anode is held in this separator. For example, the solid electrolyte layer can be formed after a capacitor element is formed by stacking the cathode and the anode having a strip form so that the organic conductive layer of the cathode and the dielectric layer of the anode face each other via the separator and then winding the stack. Also, the solid electrolyte layer can be formed after a capacitor element is formed by stacking the cathode and the anode having a desired shape so that the organic conductive layer of the cathode and the dielectric layer of the anode face each other via the separator. Further, the solid electrolyte layer can be formed after a capacitor element is formed by alternately stacking multiple pairs of cathode and anode with a separator between them so that the organic conductive layer of the cathode and the dielectric layer of the anode face each other. As the separator, a woven or non-woven fabric composed of a cellulose-based fiber such as manila paper, kraft paper, esparto paper, hemp paper, cotton paper, rayon paper and their blends, a woven or non-woven fabric composed of polyester type resin such as polyethylene terephthalate, polybutylene terephthalate, polyethylene naphthalate and their derivatives, polytetrafluoroethylene type resin, polyvinylidene fluoride type resin, vinylon type resin, polyamide type resin such as aliphatic polyamide, semi-aromatic polyamide and fully aromatic polyamide, polyimide type resin, polyethylene resin, polypropylene resin, trimethylpentene resin, polyphenylene sulfide resin, and acrylic resin, a glass paper, a glass paper mixed with manila paper or kraft paper, or the like can be used.

The solid electrolyte layer is formed by filling a dispersion liquid containing conductive polymer particles and a dispersing medium between the organic conductive layer of the cathode and the dielectric layer of the anode and drying the dispersion liquid. As the dispersing medium, a dispersing medium that does not or hardly dissolve the conductive polymer particles contained in the dispersion liquid is selected for use, and water is particularly suitable for use.

The dispersion liquid can be prepared, for example, by adding a monomer, an acid or its salt that releases a dopant and an oxidizing agent to water as a dispersing medium, stirring until chemical oxidation polymerization is completed, then removing the oxidizing agent and the residual monomer by a purification means such as ultrafiltration, cation exchange and anion exchange, and giving dispersion treatment such as ultrasonic dispersion treatment, high-speed fluid dispersion treatment and high-pressure dispersion treatment as necessary. As the monomer, a monomer with a π-conjugated double bond described above for the organic conductive layer can be used, and a monomer selected from the group consisting of thiophenes with substituents at positions 3 and 4 can preferably be used. The substituents at the 3- and 4-positions of the thiophene ring may form a ring together with the carbons at the 3- and 4-positions. 3,4-(ethylenedioxythiophene) is particularly preferred because it gives a conductive polymer that exhibits high conductivity and excellent heat resistance. As the acid or its salt that releases a dopant, a compound exemplified above as the supporting electrolyte can be used, and compounds that release a polyanion, especially polystyrene sulfonic acid or its salts can be suitably used. As the oxidizing agent, for example, trivalent iron salts such as iron(III) p-toluenesulfonate, iron(III) naphthalene sulfonate, and iron(III) anthraquinone sulfonate, or persulfates such as ammonium peroxodisulfate and sodium peroxodisulfate can be used.

The dispersion liquid can also be prepared by adding the monomer and the acid or its salt that releases a dopant to water as a dispersing medium, executing electrolytically oxidizing polymerization with stirring, followed by removing the residual monomer by a purification method such as ultrafiltration, cation exchange and anion exchange, and then, if necessary, by dispersion treatment such as ultrasonic dispersion treatment, high-speed fluid dispersion treatment, and high-pressure dispersion treatment. Furthermore, the dispersion liquid can be obtained by filtering the liquid obtained by the abovementioned chemical oxidation polymerization or electrolytic polymerization method to separate agglomerates, thoroughly washing them, adding them to water, and applying dispersion treatment such as ultrasonic dispersion treatment, high-speed fluid dispersion treatment and high-pressure dispersion treatment. The content of conductive polymer particles in the dispersion liquid is generally in the range of 1.0 to 3.0 mass %, preferably in the range of 1.5 to 2.0 mass %. The particle size of conductive polymer particles in the dispersion liquid generally ranges from 10 to 1,000 nm. There is no strict limit on the drying temperature, but it is generally in the range of 50 to 200 degrees centigrade. There is no strict limit on the drying time either, but it generally ranges from 1 to 10 hours.

The conductive polymer in the organic conductive layer of the cathode and the conductive polymer in the solid electrolyte layer may be derived from the same monomer or from different monomers. It was described above that the conductive polymer in the organic conductive layer is preferably poly(3,4-ethylenedioxythiophene), and it is preferable that the conductive polymer in the solid electrolyte layer is also poly(3,4-ethylenedioxythiophene) because it provides particularly high electrical conductivity and excellent heat resistance.

The solid electrolyte layer obtained is then impregnated with an electrolytic solution under normal or reduced pressure to form a composite electrolyte layer between the organic conductive layer of the cathode and the dielectric layer of the anode.

As the electrolytic solution, a known electrolytic solution containing at least a solvent and a solute dissolved in the solvent can be used, and it is selected according to requirements such as the operating temperature required for the hybrid electrolytic capacitor. As the electrolytic solution, for example, an electrolytic solution in which a solute such as benzoate, butyrate, phthalate, isophthalate, terephthalate, salicylate, tartrate, oxalate, malonate, malate, glutarate, adipate, azelate, maleate, fumarate, citrate, pyromellitate, trimellitate 1,6-decanedicarboxylate, formate, acetate, glycolate, lactate, 1-naphthoate, mandelate, citraconate 2,4-dihydroxybenzoate, 2,5-dihydroxybenzoate, 2,6-dihydroxybenzoate, borodisalicylate, borodioxalate and borodimaronate is dissolved into a solvent such as γ-butyrolactone, 6-valerolactone, ethylene glycol, diethylene glycol, propylene glycol, dipropylene glycol, methyl cellosolve, ethylene glycol monomethyl ether, sulfolane, 3-methylsulfolane, 2,4-dimethylsulfolane, propylene carbonate, acetonitrile and water can be used. For the salts, ammonium salts, quaternary ammonium salts such as tetramethylammonium salt and triethylmethylammonium salt, quaternized amidinium salts such as ethyldimethylimidazolinium salt and tetramethylimidazolinium salt, and amine salts such as trimethylamine salt and triethylamine salt can be exemplified. The solvent can be used alone or in a mixture of two or more kinds. The solute can also be used alone or in a mixture of two or more kinds. In addition to the solvent and solute mentioned above, the electrolytic solution may contain a publicly known additive, such as a phosphoric acid compound such as phosphoric acid and phosphoric esters, a boric acid compound such as boric acid, a sugar alcohol such as mannit, a complex compound of boric acid and a sugar alcohol, a polyoxyalkylene polyol such as polyethylene glycol, polyglycerin, polypropylene glycol for the purpose of improving the voltage resistance of the capacitor, and furthermore, the electrolytic solution may contain a nitro compound such as nitrophenol, nitrobenzoic acid, nitroanisole, and nitrobenzyl alcohol for the purpose of absorbing hydrogen that is rapidly generated especially at high temperatures.

The capacitor element to which the composite electrolyte layer has been added is then housed in an outer case and sealed to obtain the hybrid electrolytic capacitor of the present invention. In the hybrid electrolytic capacitor of the present invention, as described above, the organic conductive layer having a conductive polymer in the cathode is in contact with the composite electrolyte layer, resulting in high capacitance, low ESR, excellent high-frequency characteristics and excellent high-temperature durability.

EXAMPLES

The present invention is described using the following examples, but the present invention is not limited to the following examples.

Example 1

An aluminum foil with a sponge-like etching pit was used as a cathode substrate to obtain a cathode. This aluminum foil was subjected to a chemical conversion treatment by using an aqueous solution of ammonium dihydrogen phosphate as a chemical conversion solution to form a chemical oxide film (oxide layer) with a formation voltage of 5.0 $V_{fs}$ on the surface of the aluminum foil. Then, a vapor-deposited film of titanium carbide was formed on the surface of the chemical oxide film by arc ion plating to obtain a support having a titanium carbide vapor-deposited film (inorganic conductive layer).

50 mL of distilled water was introduced into a glass vessel and heated to 40 degrees centigrade. To this liquid, 0.021 M 3,4-(ethylenedioxythiophene) (hereinafter 3,4-(ethylenedioxythiophene) is referred to as "EDOT" and poly(3,4-(ethylenedioxythiophene)) is denoted as "PEDOT") and 0.08M ammonium borodisalicylate were added and stirred to obtain a polymerization solution for electrolytic polymerization. Then, the abovementioned support (working electrode) and a counter electrode of SUS mesh having an area of 10 cm$^2$ were introduced to this polymerization solution and galvanostatic electrolytic polymerization was performed at a current of 0.1 mA/cm$^2$ for 1 minute. The working electrode after polymerization was washed with water, then dried at 100 degrees centigrade for 30 minutes, and a PEDOT layer (organic conductive layer) with a thickness of 35 nm and a density of approximately 1.6 g/cm$^3$ was formed on the inorganic conductive layer to obtain a cathode for a hybrid electrolytic capacitor. The thickness of the PEDOT layer is a value obtained by performing galvanostatic electrolytic polymerization several times at 0.1 mA/cm$^2$ for different times, measuring the thickness of the PEDOT layer obtained in each experiment by using an atomic force microscope or step meter, deriving a relational expression between the thickness of the PEDOT layer and the amount of charge, and converting the charge amount of electrolytic polymerization to the thickness of the PEDOT layer by using the derived relational expression.

An etched aluminum foil was used as an anode substrate to obtain an anode. This aluminum foil was subjected to a chemical conversion treatment by using an aqueous ammonium adipate solution as a chemical conversion solution to form a chemical oxide film (dielectric layer) at a formation voltage of 47.3 $V_{fs}$ on the surface of the aluminum foil to obtain an anode for a hybrid electrolytic capacitor.

The resulting anode and cathode were each connected to a terminal, stacked with the dielectric layer of the anode and the organic conductive layer of the cathode facing each other through a separator and wound around. Then, the anode was subjected to a restoring chemical conversion using an aqueous solution of ammonium dihydrogen phosphate for 15 minutes at an applied voltage of 40.5 V and with 10 mA of current and then dried at 105 degrees centigrade for 30 minutes to obtain a capacitor element.

Fine particles of poly(3,4-ethylenedioxythiophene) and polystyrenesulfonic acid were dispersed in a dispersion medium in which 5 mass % ethylene glycol was added to water in order to obtain a dispersion liquid for forming a solid electrolyte layer. The abovementioned capacitor element was impregnated with the obtained dispersion liquid under 30 kPa pressure for 120 seconds and dried at 150 degrees centigrade for 30 seconds. This impregnation and drying were repeated again to obtain a capacitor element with an additional solid electrolyte layer.

An electrolytic solution was prepared by dissolving 5 mass % ammonium borodisalicylate in ethylene glycol. A fixed amount of this electrolytic solution was discharged into the capacitor element to which the solid electrolyte layer had been added, thereby impregnating the solid electrolyte layer with the electrolytic solution, and a capacitor element with an additional composite electrolyte layer was obtained. The resulting element was sealed in an outer case to obtain a hybrid electrolytic capacitor with a diameter of 8 mm and a height of 10 mm.

The obtained hybrid electrolytic capacitor was subjected to an aging treatment for 45 minutes under the temperature condition of 115 degrees centigrade by applying a voltage of 28.2V to obtain a hybrid electrolytic capacitor with a rated voltage of 25 V. In order to measure the initial characteristics of the obtained capacitor, the capacitance at 120 Hz and 20 kHz, and ESR at 20 kHz and 100 kHz were measured under the temperature condition of 20 degrees centigrade. Then, as an endurance test, a high temperature endurance test was conducted in which a 25 V DC voltage was applied for 4,000 hours under the high temperature condition of 150 degrees centigrade, and then, in order to measure the characteristics after the endurance test, the capacitance at 120 Hz and 20 kHz, and ESR at 20 kHz and 100 kHz were measured again under the temperature condition of 20 degrees centigrade.

Example 2

The procedure of Example 1 was repeated, except that galvanostatic electrolytic polymerization was carried out for 2 minutes at 0.1 mA/cm$^2$ by using the polymerization solution for electrolytic polymerization used in Example 1 and a cathode having a PEDOT layer (organic conductive layer) with a thickness of 70 nm and a density of about 1.6 g/cm$^3$ was obtained on the abovementioned titanium carbide vapor-deposited film (inorganic conductive layer).

Example 3

The procedure of Example 1 was repeated, except that galvanostatic electrolytic polymerization was carried out for 4.5 minutes at 0.1 mA/cm$^2$ by using the polymerization solution for electrolytic polymerization used in Example 1 and a cathode having a PEDOT layer (organic conductive layer) with a thickness of 150 nm and a density of about 1.6 g/cm$^3$ was obtained on the abovementioned titanium carbide vapor-deposited film (inorganic conductive layer).

Example 4

The procedure of Example 1 was repeated, except that galvanostatic electrolytic polymerization was carried out for 10 minutes at 0.1 mA/cm$^2$ by using the polymerization solution for electrolytic polymerization used in Example 1 and a cathode having a PEDOT layer (organic conductive layer) with a thickness of 350 nm and a density of about 1.6 g/cm$^3$ was obtained on the abovementioned titanium carbide vapor-deposited film (inorganic conductive layer).

Comparative Example 1

An aluminum foil with a sponge-like etching pit was used as a cathode substrate to obtain a cathode. This aluminum foil was subjected to a chemical conversion treatment by using an aqueous solution of ammonium dihydrogen phosphate as a chemical conversion solution to form a chemical oxide film (oxide layer) with a formation voltage of 3.0 $V_{fs}$ on a surface of the aluminum foil, and a cathode on which neither inorganic nor organic conductive layers were formed was obtained. The procedure of Example 1 was repeated, except that the obtained cathode was used instead of the cathode in Example 1.

Comparative Example 2

An aluminum foil with a sponge-like etching pit was used as a cathode substrate to obtain a cathode. This aluminum foil was subjected to a chemical conversion treatment by using an aqueous solution of ammonium dihydrogen phosphate as a chemical conversion solution to form a chemical oxide film (oxide layer) with a formation voltage of 5.0 $V_{fs}$ on a surface of the aluminum foil. Then, a vapor-deposited film of titanium carbide was formed on a surface of the chemical oxide film by arc ion plating to obtain a cathode with the titanium carbide vapor-deposited film (inorganic conductive layer) and without an organic conductive layer. The procedure of Example 1 was repeated, except that the obtained cathode was used instead of the cathode in Example 1.

Example 5

An aluminum foil without an etching pit was used as a cathode substrate to obtain a cathode. In this example, no chemical oxide film was formed and a natural oxide film was used as an oxide layer. Next, instead of a titanium carbide vapor-deposited film, a vapor-deposited film composed of carbon was formed on the surface of the natural oxide film by sputtering to obtain a support with a carbon vapor-deposited film (inorganic conductive layer).

In the electrolytic polymerization solution used in Example 1, the abovementioned support as a working electrode and a counter electrode of SUS mesh with an area of 10 cm$^2$ were introduced, and galvanostatic electrolytic polymerization was performed at 0.1 mA/cm$^2$ for 10 minutes. The working electrode after polymerization was washed with water and dried at 100 degrees centigrade for 30 minutes to form a PEDOT layer (organic conductive layer) with a thickness of 350 nm and a density of approximately 1.6 g/cm$^3$ on the carbon vapor-deposited film (inorganic conductive layer) to obtain a cathode for a hybrid electrolytic capacitor. The procedure of Example 1 was repeated, except that the resulting cathode was used instead of the cathode in Example 1.

Comparative Example 3

An aluminum foil without an etching pit was used as a cathode substrate to obtain a cathode. In this comparative example, no chemical oxide film was formed and a natural oxide film was used as an oxide layer. Next, instead of a titanium carbide vapor-deposited film, a vapor-deposited film composed of carbon was formed on the surface of the natural oxide film by sputtering to obtain a cathode with a carbon vapor-deposited film (inorganic conductive layer) and without an organic conductive layer. The procedure of Example 1 was repeated, except that the resulting cathode was used instead of the cathode in Example 1.

Example 6

An aluminum foil with a sponge-like etching pit was used as a cathode substrate to obtain a cathode. This aluminum foil was subjected to a chemical conversion treatment by using an aqueous solution of ammonium dihydrogen phosphate as a chemical conversion solution to form a chemical oxide film (oxide layer) with a formation voltage of 1.2 $V_{fs}$ on the surface of the aluminum foil.

As carbon particles, scale graphite with an average particle diameter of 4.5 µm and acetylene black with an average primary particle diameter of 50 nm and an average secondary particle diameter of 0.3 µm were used. Carbon slurry was prepared by mixing a mixture of the scale graphite and the acetylene black at a mass ratio of 75:25, styrene butadiene rubber and an aqueous solution of sodium carboxymethylcellulose at a mass ratio of 84:10:6, and dispersing the mixture obtained with a stirrer.

The resulting carbon slurry was applied over the abovementioned chemical oxide film and dried to form a slurry layer. This slurry layer was pressed by a roll press with a linear pressure of 5.38 kNcm$^{-1}$ to obtain a support for a hybrid electrolytic capacitor with a 1 µm thick carbon coated film (inorganic conductive layer). The cross section of this support was observed by an SEM photograph, and it was found that the acetylene black had entered until approximately one third of the length of the etching pit. Also, pieces of the scale graphite were oriented so that their basal surfaces overlapped each other, and the acetylene black was filled between these graphite pieces. Furthermore, a support with a carbon coating layer of 20 µm thickness was prepared for the purpose of confirmation by applying and drying the abovementioned carbon slurry on the carbon coated film of the support for a solid electrolytic capacitor, and the interface resistance of this support was measured with an electrode resistance measurement system (model number RM2610, manufactured by HIOKI E.E. CORPORATION). The interface resistance was 1.78 mΩcm$^2$, and this value indicated that the carbon coated film of the support for a solid electrolytic capacitor was conductive to the aluminum of the cathode substrate.

In the electrolytic polymerization solution used in Example 1, the abovementioned support as a working electrode and a counter electrode of SUS mesh with an area of 10 cm$^2$ were introduced, and galvanostatic electrolytic polymerization was performed at 0.1 mA/cm$^2$ for 10 minutes. The working electrode after polymerization was washed with water and dried at 100 degrees centigrade for 30 minutes to form a PEDOT layer (organic conductive layer) with a thickness of 350 nm and a density of approximately 1.6 g/cm$^3$ on the carbon coated film (inorganic conductive layer) to obtain a cathode for a hybrid electrolytic capacitor. The procedure of Example 1 was repeated, except that the resulting cathode was used instead of the cathode in Example 1.

Comparative Example 4

An aluminum foil with a sponge-like etching pit was used as a cathode substrate to obtain a cathode. This aluminum foil was subjected to a chemical conversion treatment by using an aqueous solution of ammonium dihydrogen phosphate as a chemical conversion solution to form a chemical oxide film (oxide layer) with a formation voltage of 1.2 $V_{fs}$ on a surface of the aluminum foil. Then, a carbon coated film was formed using the same procedure as shown in Example 6 to obtain a cathode with a carbon coated film (inorganic conductive layer) and without an organic conductive layer. The procedure of Example 1 was repeated, except that the resulting cathode was used instead of the cathode in Example 1.

Table 1 shows the capacitance values at 20 degrees centigrade obtained for the hybrid electrolytic capacitors of Examples 1 to 6 and Comparative Examples 1 to 4, and Table 2 shows the ESR values at 20 degrees centigrade obtained for the hybrid electrolytic capacitors of Examples 1 to 6 and Comparative Examples 1 to 4.

TABLE 1

| | Etching in cathode substrate | Oxide layer | Inorganic conductive layer | PEDOT thickness (nm) | Capacitance/120 Hz | | | Capacitance/20 kHz | | |
|---|---|---|---|---|---|---|---|---|---|---|
| | | | | | initial (μF) | post-test (μF) | rate of change (%) | initial (μF) | post-test (μF) | rate of change (%) |
| Comparative Example 1 | sponge-like | 3V chemical oxide film | N/A | 0 | 196 | 190 | −3.1 | 143 | 129 | −9.8 |
| Comparative Example 2 | sponge-like | 5V chemical oxide film | titanium carbide vapor deposition | 0 | 253 | 251 | −0.8 | 168 | 136 | −19.0 |
| Example 1 | sponge-like | 5V chemical oxide film | titanium carbide vapor deposition | 35 | 252 | 249 | −1.2 | 194 | 169 | −12.9 |
| Example 2 | sponge-like | 5V chemical oxide film | titanium carbide vapor deposition | 70 | 252 | 251 | −0.4 | 205 | 185 | −9.8 |
| Example 3 | sponge-like | 5V chemical oxide film | titanium carbide vapor deposition | 150 | 251 | 249 | −0.8 | 205 | 181 | −11.7 |
| Example 4 | sponge-like | 5V chemical oxide film | titanium carbide vapor deposition | 350 | 252 | 250 | −0.8 | 216 | 200 | −7.4 |
| Comparative Example 3 | N/A | natural oxide film | carbon vapor deposition | 0 | 257 | 251 | −2.3 | 134 | 84 | −37.3 |
| Example 5 | N/A | natural oxide film | carbon vapor deposition | 350 | 250 | 249 | −0.4 | 204 | 183 | −10.3 |
| Comparative Example 4 | sponge-like | 1.2V chemical oxide film | carbon sllury coating | 0 | 255 | 251 | −1.6 | 208 | 190 | −8.7 |
| Example 6 | sponge-like | 1.2V chemical oxide film | carbon sllury coating | 350 | 251 | 251 | 0 | 212 | 195 | −8.0 |

TABLE 2

| | Etching in cathode substrate | Oxide layer | Inorganic conductive layer | PEDOT thickness (nm) | ESR/20 kHz | | | ESR/100 kHz | | |
|---|---|---|---|---|---|---|---|---|---|---|
| | | | | | initial (mΩ) | post-test (mΩ) | rate of change (%) | initial (mΩ) | post-test (mΩ) | rate of change (%) |
| Comparative Example 1 | sponge-like | 3V chemical oxide film | N/A | 0 | 21.8 | 27.6 | +26.6 | 13.5 | 16.5 | +22.2 |
| Comparative Example 2 | sponge-like | 5V chemical oxide film | titanium carbide vapor deposition | 0 | 38.6 | 68.4 | +77.2 | 27.2 | 48.8 | +79.4 |
| Example 1 | sponge-like | 5V chemical oxide film | titanium carbide vapor deposition | 35 | 21.8 | 31.4 | +44.0 | 15.0 | 20.8 | +38.7 |
| Example 1 | sponge-like | 5V chemical oxide film | titanium carbide vapor deposition | 70 | 18.6 | 25.4 | +36.6 | 13.2 | 17.2 | +30.3 |
| Example 3 | sponge-like | 5V chemical oxide film | titanium carbide vapor deposition | 150 | 18.9 | 27.2 | +43.9 | 13.6 | 18.6 | +36.8 |
| Example 4 | sponge-like | 5V chemical oxide film | titanium carbide vapor deposition | 350 | 14.9 | 20.5 | +37.6 | 11.3 | 14.7 | +30.1 |
| Comparative Example 3 | N/A | natural oxide film | carbon vapor deposition | 0 | 76.8 | 154.5 | +101.2 | 55.3 | 105.6 | +91.0 |
| Example 5 | N/A | natural oxide film | carbon vapor deposition | 350 | 16.6 | 23.2 | +39.8 | 11.7 | 15.5 | +32.5 |
| Comparative Example 4 | sponge-like | 1.2V chemical oxide film | carbon sllury coating | 0 | 19.9 | 33.8 | +69.8 | 14.6 | 26.6 | +82.2 |
| Example 6 | sponge-like | 1.2V chemical oxide film | carbon sllury coating | 350 | 17.0 | 23.7 | +39.4 | 12.9 | 16.9 | +31.0 |

First, the capacitance vales of the hybrid electrolytic capacitors shown in Table 1 are examined. Although it has already been shown in the Patent Documents 3 to 7 that an inorganic conductive layer can increase the capacitance of the capacitor by bringing the cathode capacitance close to infinity, evaluations to date have been conducted only under the condition of 120 Hz, and the capacitance in the high-frequency region (20 kHz) is not shown. As is clear from comparing the capacitance of the capacitor with the cathode having a titanium carbide vapor-deposited film in Comparative Example 2 and the capacitance of the capacitor with a carbon vapor-deposited film in Comparative Example 3 with the capacitance of the capacitor with a cathode without an inorganic conductive layer in Comparative Example 1, the measures in the prior Documents do not increase capacitance in the high-frequency region (20 kHz), although the capacitance at 120 Hz is increased. In contrast, the capacitance of the capacitor with a cathode having a carbon coated film which was disclosed by the applicant in PCT/JP2019/022741 increases even in the high-frequency region (20 kHz). This is due to the fact that the carbon coated film has an entry area that enters an etching pit and a penetrating area that penetrates through the oxide layer and conducts to the cathode substrate.

In contrast, as can be clearly confirmed by comparing the capacitance of the capacitors of Examples 1 to 4 with a cathode having a dense organic conductive layer having a conductive polymer with the capacitance of the corresponding capacitor of Comparative Example 2, comparing the capacitance of the capacitor of Example 5 with capacitance of the corresponding capacitor of Comparative Example 3, and comparing the capacitance of the capacitor of Example 6 with the capacitance of the corresponding capacitor of Comparative Example 4, the capacitance of the capacitors in Examples increases not only at 120 Hz but also at 20 kHz, regardless of the type of inorganic conductive layer of the cathode and regardless of whether the oxide layer is a chemical oxide film or a natural oxide film, and regardless of whether the cathode substrate has an etching pit. This is because the dense organic conductive layer having a conductive polymer was provided in the cathode, which effectively lowered the interface resistance between this organic conductive layer and the composite electrolyte layer and expanded the area where the resistance of the cathode oxide film $R_{COX}$ becomes remarkably larger than the interface resistance $R_{IN}$ as is shown in the left figure of FIG. 3 to the high frequency-region.

As can be seen from Table 1, the capacitors in Examples 1 to 6 show little capacitance change before and after the extremely severe high temperature endurance test at 150 degrees centigrade for 4,000 hours, both in the low-frequency region and in the high-frequency region. The capacitance change before and after the high temperature endurance test was more improved in the capacitor with a cathode whose inorganic conductive layer was composed of carbon than in the capacitor with a cathode whose inorganic conductive layer is composed of titanium carbide, and the capacitor in Example 6 with a cathode with a carbon coated film showed particularly excellent high-temperature endurance.

Next, the ESR values of the hybrid electrolytic capacitors shown in Table 2 are examined. As is obvious when the ESR of the capacitor with a cathode having a titanium carbide vapor-deposited film in Comparative Example 2 and the capacitor with a cathode having a carbon vapor-deposited film in Comparative Example 3 are compared with the ESR of the capacitor with a cathode without an inorganic conductive layer in Comparative Example 1, the inorganic conductive layers in the prior Documents increased not only the ESR at 20 kHz but also the ESR at 100 kHz, and the ESR change before and after the high temperature endurance test was also significant. This increase in the ESR change before and after the high temperature endurance test due to the use of the cathode with an inorganic conductive layer but without an organic conductive layer was also seen in the capacitor of Comparative Example 4.

However, as can be clearly confirmed by comparing the ESR of the capacitors in Examples 1 to 4 with a cathode having a dense organic conductive layer having a conductive polymer with the ESR of the corresponding capacitor in Comparative Example 2, comparing the ESR of the capacitor in Example 5 with the ESR of the corresponding capacitor in Comparative Example 3, and comparing the ESR of the capacitor in Example 6 with the ESR of the corresponding capacitor in Comparative Example 4, the ESR of the capacitors in Examples was remarkably reduced not only at 20 kHz but also at 100 kHz, regardless of the type of inorganic conductive layer of the cathode, regardless of whether the oxide layer was a chemical conversion film or a natural oxide film, and regardless of whether there was an etching pit in the cathode substrate, and the ESR change before and after the high temperature endurance test was remarkably suppressed. This is due to the fact that the cathode was provided with the dense organic conductive layer with excellent adhesion to both the composite electrolyte layer and the inorganic conductive layer, resulting in a lower interface resistance and maintenance of this lower interface resistance during the high temperature endurance test.

INDUSTRIAL APPLICABILITY

The present invention provides hybrid electrolytic capacitors with high capacitance, low ESR, excellent high-frequency characteristics and excellent high-temperature durability.

EXPLANATION OF REFERENCES 1 hybrid electrolytic capacitor
10 cathode
11 cathode substrate
12 oxide layer
13 inorganic conductive layer
14 organic conductive layer
20 anode
21 anode substrate
22 dielectric layer
30 composite electrolyte layer
31 solid electrolyte layer
31a particles of conductive polymer
32 electrolytic solution

What is claimed is:
1. A hybrid electrolytic capacitor comprising:
a cathode comprising a cathode substrate composed of a valve metal, an oxide layer composed of an oxide of the valve metal provided on a surface of the cathode substrate, an inorganic conductive layer having an inorganic conductive material provided on a surface of the oxide layer, and an organic conductive layer having a conductive polymer provided on a surface of the inorganic conductive layer;
an anode comprising an anode substrate composed of a valve metal, and a dielectric layer composed of an oxide of the valve metal that composes the anode substrate and provided on a surface of the anode substrate; and
a composite electrolyte layer comprising a solid electrolyte layer having conductive polymer particles that is provided between and in contact with the organic conductive layer of the cathode and the dielectric layer of the anode, and an electrolytic solution filled between the conductive polymer particles in the solid electrolyte layer,
wherein the organic conductive layer in the cathode has a density in the range of 1.15 to 1.80 g/cm$^3$.
2. The hybrid electrolytic capacitor according to claim 1, wherein the organic conductive layer in the cathode is an electropolymerized film.
3. The hybrid electrolytic capacitor according to claim 1, wherein the conductive polymer in the organic conductive layer of the cathode and the solid electrolyte layer of the composite electrolyte layer is poly(3,4-ethylenedioxythiophene).
4. The hybrid electrolytic capacitor according to claim 1, wherein the inorganic conductive material in the inorganic conductive layer is carbon.
5. The hybrid electrolytic capacitor according to claim 1, wherein
the cathode substrate has an etching pit,
the inorganic conductive layer is a carbon coating layer having carbon particles, and the carbon coating layer has an entry area entering the etching pit and a penetration area penetrating through the oxide layer and conducting with the cathode substrate.

6. The hybrid electrolytic capacitor according to claim 2, wherein the conductive polymer in the organic conductive layer of the cathode and the solid electrolyte layer of the composite electrolyte layer is poly(3,4-ethylenedioxythiophene).

7. The hybrid electrolytic capacitor according to claim 2, wherein the inorganic conductive material in the inorganic conductive layer is carbon.

8. The hybrid electrolytic capacitor according to claim 2, wherein
the cathode substrate has an etching pit,
the inorganic conductive layer is a carbon coating layer having carbon particles, and
the carbon coating layer has an entry area entering the etching pit and a penetration area penetrating through the oxide layer and conducting with the cathode substrate.

9. The hybrid electrolytic capacitor according to claim 4, wherein
the cathode substrate has an etching pit,
the inorganic conductive layer is a carbon coating layer having carbon particles, and
the carbon coating layer has an entry area entering the etching pit and a penetration area penetrating through the oxide layer and conducting with the cathode substrate.

10. The hybrid electrolytic capacitor according to claim 6, wherein the inorganic conductive material in the inorganic conductive layer is carbon.

11. The hybrid electrolytic capacitor according to claim 6, wherein
the cathode substrate has an etching pit,
the inorganic conductive layer is a carbon coating layer having carbon particles, and
the carbon coating layer has an entry area entering the etching pit and a penetration area penetrating through the oxide layer and conducting with the cathode substrate.

12. A method for manufacturing a hybrid electrolytic capacitor comprising:
a cathode formation process having a step of forming an inorganic conductive layer using an inorganic conductive material on a surface of an oxide layer composed of an oxide of a valve metal formed on a surface of a cathode substrate composed of the valve metal, and a step of forming an organic conductive layer having a conductive polymer on a surface of the inorganic conductive layer via electrolytic polymerization of a monomer having a π-conjugated double bond;
an anode formation process of forming a dielectric layer by oxidizing a surface of an anode substrate composed of a valve metal; and
a complex electrolyte layer formation process having a step of forming a solid electrolyte layer by filling a dispersion liquid with conductive polymer particles and a dispersion medium between the organic conductive layer of the cathode and the dielectric layer of the anode and drying the dispersion liquid, and a step of impregnating the solid electrolyte layer with an electrolytic solution,
wherein the organic conductive layer has a density in the range of 1.15 to 1.80 g/cm$^3$.

13. The method for manufacturing a hybrid electrolytic capacitor according to claim 12,
wherein the cathode substrate has an etching pit, and, in the cathode formation process, a slurry containing carbon particles is applied to the surface of the oxide layer on the cathode substrate and dried to obtain a slurry layer and then the slurry layer is subjected to press to push the carbon particles into the etching pit and to make the carbon particles penetrate through the oxide layer and conduct with the cathode substrate to form a carbon coating layer having an entry area entering the etching pit and a penetration area penetrating through the oxide layer and conducting with the cathode substrate as the inorganic conductive layer.

* * * * *